United States Patent [19]
Diore et al.

[11] Patent Number: 5,687,636
[45] Date of Patent: Nov. 18, 1997

[54] COFFEEMAKER

[75] Inventors: Christian Diore, Saint Germain du Corbeis; Christian Bernard Jouatel, Radon, both of France

[73] Assignee: Moulinex S.A., Bagnolet, France

[21] Appl. No.: 650,369

[22] Filed: May 20, 1996

[30] Foreign Application Priority Data

May 18, 1995 [FR] France .................. 95 05875

[51] Int. Cl.⁶ .................................................. A47J 31/02
[52] U.S. Cl. .......................... 99/285; 99/306; 99/304
[58] Field of Search .......................... 99/285, 295, 300, 99/304, 306

[56] References Cited

U.S. PATENT DOCUMENTS

| | | | |
|---|---|---|---|
| 4,155,292 | 5/1979 | Rickert | 99/306 |
| 4,467,707 | 8/1984 | Amiot | 99/295 X |
| 4,748,901 | 6/1988 | Burmeister | 99/306 |
| 5,239,914 | 8/1993 | Salomon et al. | 99/295 X |
| 5,485,778 | 1/1996 | Ullmann | 99/295 |
| 5,503,060 | 4/1996 | Morecroft et al. | 99/304 X |

*Primary Examiner*—Reginald Alexander
*Attorney, Agent, or Firm*—Young & Thompson

[57] ABSTRACT

A coffeemaker comprises, in a housing (1), a cold water reservoir (2) supplying a water heater (3) which in turn supplies a water spout (5) whose outlet (6) is arranged above a filter carrier (7) which is movably mounted in the housing (1) and whose bottom has an outlet opening (8) located above a server (9) collecting the infusion, the server resting on a base (10). The cold water reservoir (2) of the coffeemaker overlies the base (10) and the filter carrier (7) of the coffeemaker is arranged behind the cold water reservoir (2).

8 Claims, 4 Drawing Sheets

5,687,636

COFFEEMAKER

BACKGROUND OF THE INVENTION

The invention relates to coffeemakers comprising, in a housing, a reservoir of cold water supplying a water heater in turn supplying a water spout whose outlet is arranged in wetting position above a filter carrier which is movably mounted in the housing and whose bottom has a flow opening located above a server for collecting infusion resting on a base.

In coffeemakers of this type, the filter carrier is generally arranged in the forward region of the housing, whilst the cold water reservoir located in the rear region of the housing partially embraces the filter carrier; this arrangement permits obtaining both reduced size and easy filling with ground coffee. However, the use of this type of coffeemaker is inconvenient particularly when it is placed on a working surface backing against a wall. Thus, the operation of filling with water requires a certain dexterity because it is necessary to pour either from above the filter or laterally thereof. But in the latter case the filling section of the reservoir is fairly narrow because the reservoir has a horizontal section in the form of a crescent moon.

Moreover, because of this inconvenience of filling, spilling can take place outside the reservoir giving rise not only to soiling the housing and the base but also the intrusion of water into the housing which can give rise to electrical short circuits.

OBJECT OF THE INVENTION

The object of the invention is therefore to overcome these above drawbacks, whilst maintaining a compact construction for the coffeemaker.

SUMMARY OF THE INVENTION

According to the invention, the cold water reservoir overlies the base and the filter carrier is arranged behind the cold water reservoir.

Thus, thanks to the coffeemaker according to the invention, the water reservoir is located in the forward face of the coffeemaker and hence offers easy filling, the ease of which is increased by the large width of cross section which faces the user.

According to another characteristic of the invention, the cold water reservoir has a front side wall in which is provided a transparent window turned outwardly. This window arranged in the forward region of the housing thus ensures perfect visibility, on the one hand, of the water level in the course of the operation of filling the cold water reservoir and on the other hand, of the final water level in the course of operation of the coffeemaker. This new design of the coffeemaker thus provides a practical and useful assembly for the user.

Moreover, thanks to this window, it is no longer necessary to use a water level tube added to the reservoir at a not negligible cost.

BRIEF DESCRIPTION OF THE DRAWINGS

Other characteristics and advantages of the invention will become apparent from the description which follows, given by way of nonlimiting example, with reference to the accompanying drawings, in which.

DETAILED DESCRIPTION OF THE INVENTION

Figure 1:
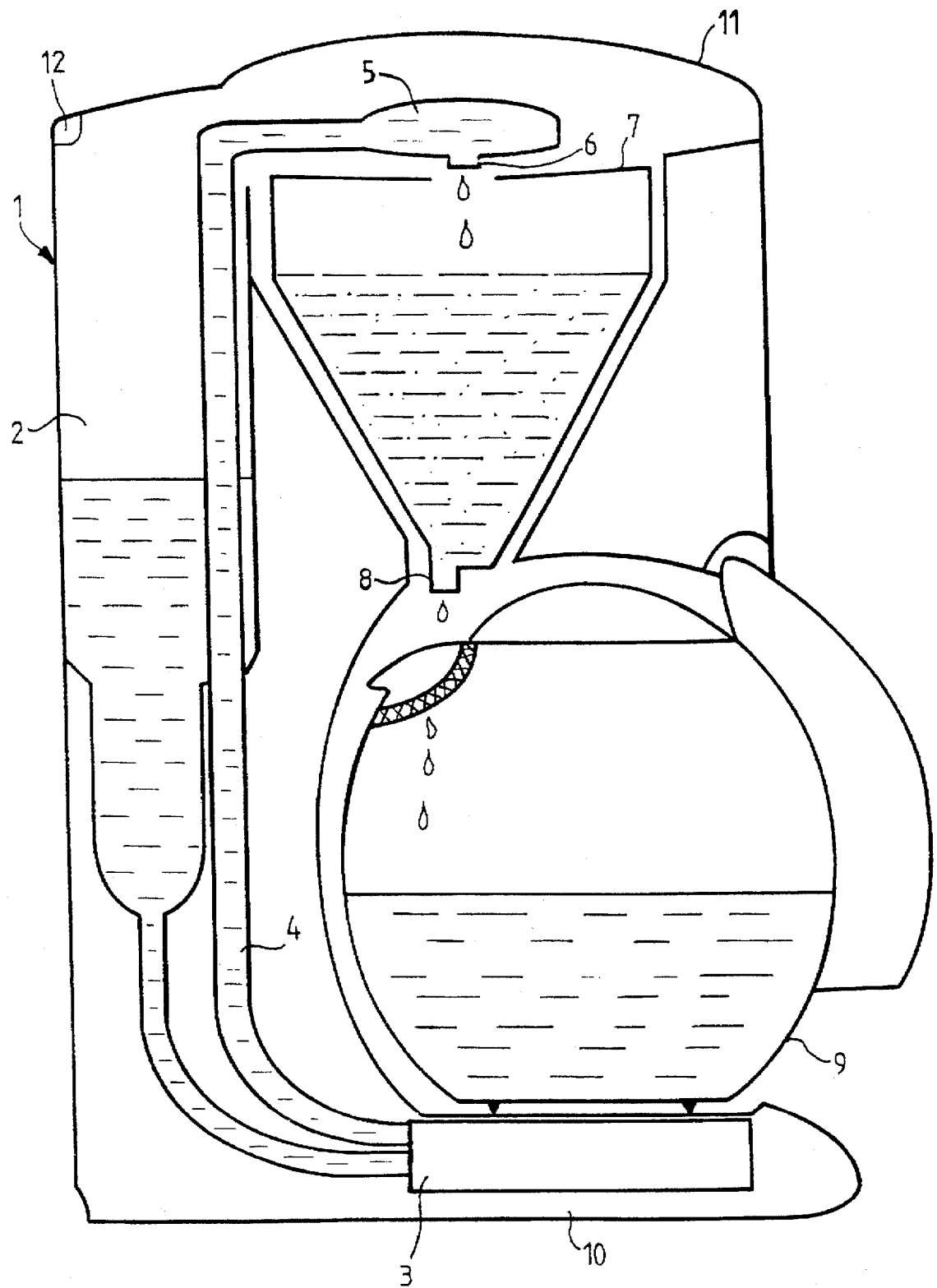
FIG. 1 is a schematic view of a coffeemaker according to the prior art.

As is seen in FIG. 1, a coffeemaker of the drip type according to the prior art, comprises a housing 1, a cold water reservoir 2, as well as a water heater 3 supplied by this reservoir and in turn supplying by an ascending tube 4, a water spout 5 whose outlet 6 is arranged in wetting position above a filter carrier 7 known per se which is movably mounted in said housing 1 and adapted to receive the ground coffee.

The bottom of the filter carrier 7 has a flow opening 8 located above a server 9 for collecting infusion resting on a base 10 heated by the water heater 3.

Said coffeemaker comprises moreover a cover 11 which, on the one hand, extends above the cold water reservoir 2, the water spout 5 and the filter carrier 7 and which is mounted swingably on the housing 1 about a horizontal axle 12.

The housing 1 and therefore the cold water reservoir 2 shown in part, have substantially in horizontal cross section the shape of a crescent moon and surround partially the server 9 resting on the base 10 as well as the filter carrier 7 disposed above. The cross section of filling of the water reservoir arranged in the rear region of the housing, even if it extends overall over half a circumference, thus has a narrow width at the widest part of its extent and, because of this, during a filling operation, the user must act with great precaution to fill properly said reservoir.

Figure 2:
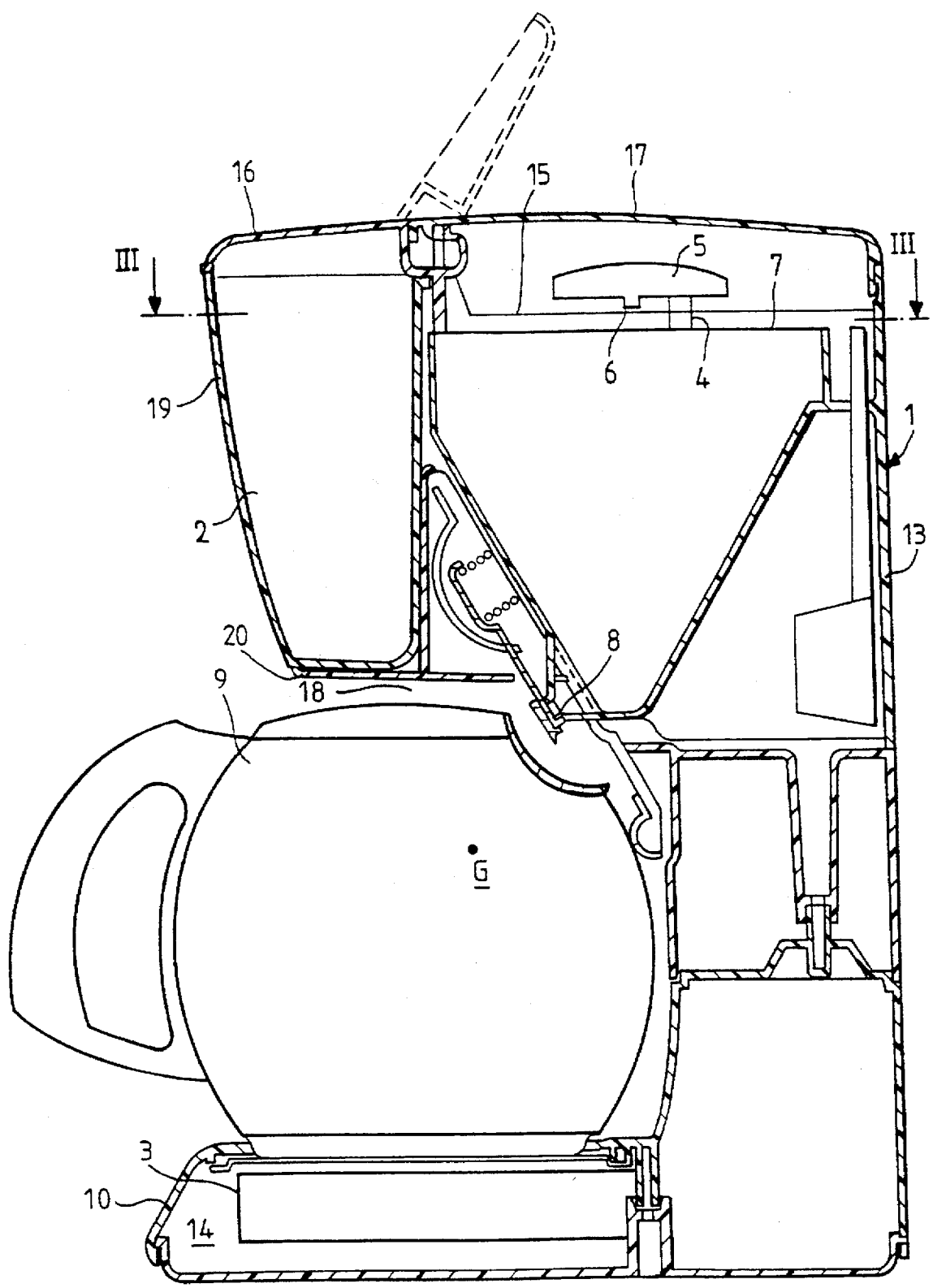
FIG. 2 is a view in vertical cross section of a coffeemaker according to the invention.

FIG. 2 shows a coffeemaker of the drip type according to the invention, said coffeemaker is provided with principal elements described in FIG. 1 and designated by the same reference numerals.

According to the invention, the cold water reservoir 2 of said coffeemaker overlies the base 10 and the filter carrier 7 of said coffeemaker is arranged behind the cold water reservoir 2.

The cold water reservoir 2 has a front side wall in which is provided a transparent window 19 visible from outside through an opening 20 provided in the housing 1. In a preferred embodiment, the side front wall of the reservoir 2 is made of a transparent plastic material.

The housing 1 has a side wall 13 of generally tubular shape of which one end 14 is closed by the base 10 and of which the other end 15 comprises at least one movable cover. In the embodiment shown, the end 15 comprises two covers 16 and 17 hinged on the housing 1, the cover 16 closing the water reservoir and the cover 17 closing the filter carrier 7.

Figure 3:
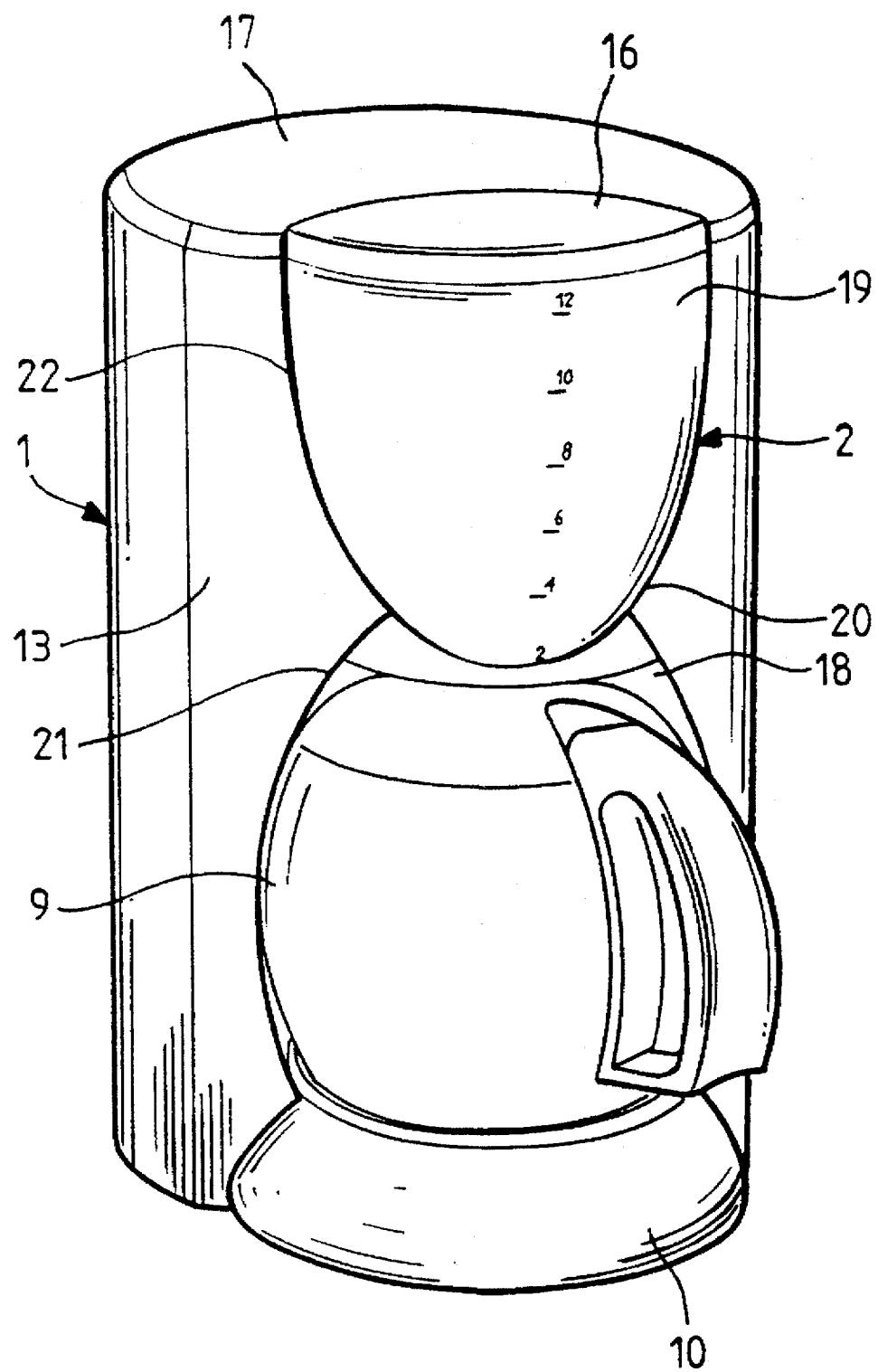
FIG. 3 is a perspective view, on a smaller scale, of the coffeemaker of FIG. 2.

As is better seen in FIG. 3, the front region of the side wall 13 has above the base 10 a reception niche 18 for the server 9 and, above this niche, the opening 20 through which is visible the transparent window 19 of the cold water reservoir 2. The reception niche 18 has an entrance profile 21 of generally parabolic shape whilst the opening 20 has a shape 22 which is generally parabolic but inverted relative to the profile 21, the parabolic profile 22 intersecting the entrance profile 21.

Figure 4:
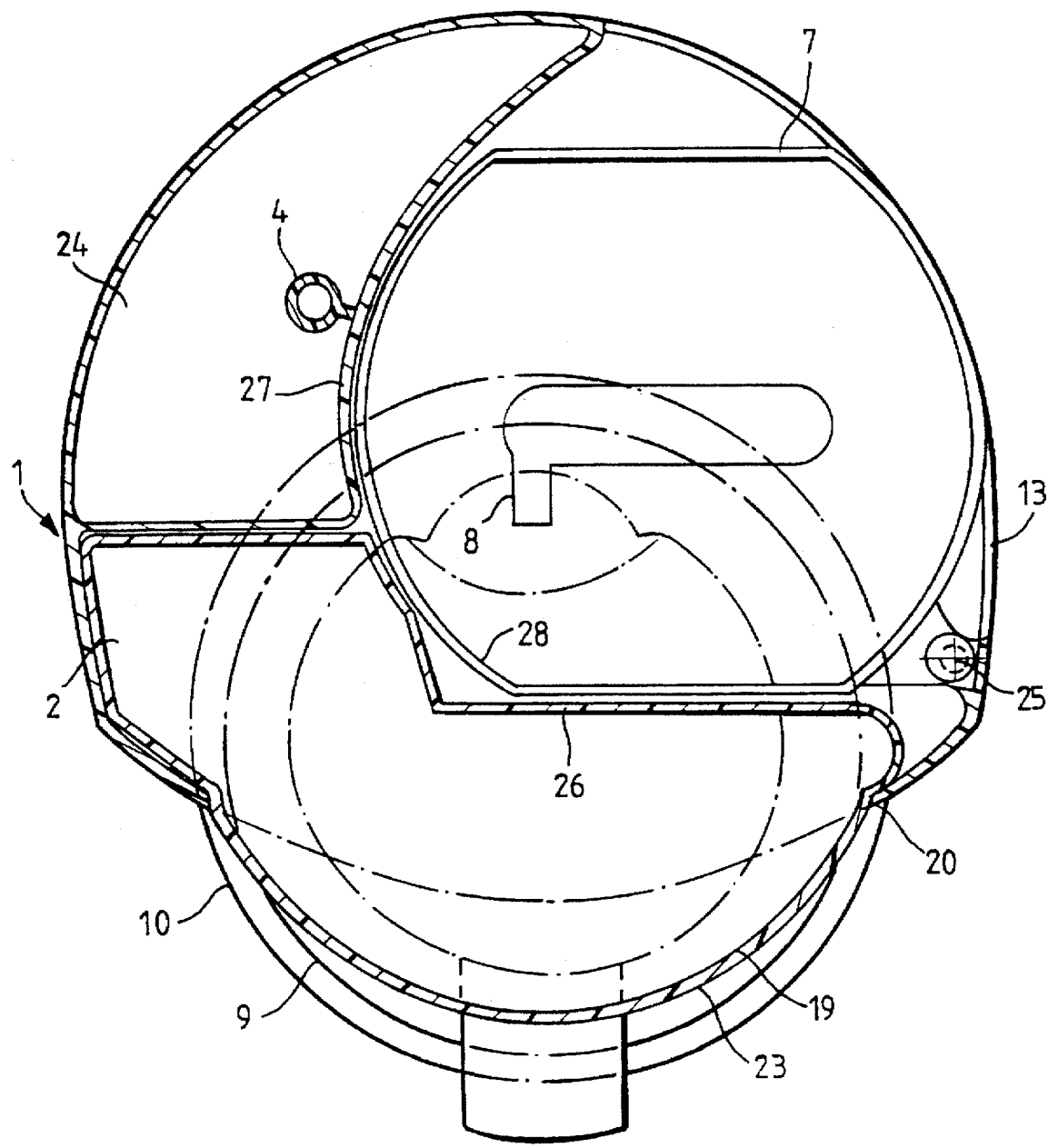
FIG. 4 is a view from above, on an enlarged scale, of the coffeemaker, on the line III—III of FIG. 2.

As is shown in FIG. 4, the cold water reservoir contained in large part within the housing 1 has a generally semicylindrical shape. The transparent window 20 has a protrusion 23 which projects from the opening 19 of the housing 1. The spout 5 not shown in this figure is supplied by means of a rising tube 4 located in a compartment 24 arranged behind the cold water reservoir 2 and laterally of the filter carrier 7. The filter carrier 7 arranged behind the water reservoir 2 is pivotally mounted about a vertical axle 25. Said axle 25 is mounted hingedly adjacent the periphery of the housing 1 in a region opposite the compartment 24. The arrangement of the water reservoir 2 principally in the forward portion of the housing 1 permits displacing the center of gravity G of the coffeemaker. Thus the center of gravity G is located in the niche 18 adjacent the vertical line passing through the center of the base which improves the stability of said coffeemaker with or without water in the reservoir 2. So as to achieve a compact arrangement of the reservoir 2, of the compartment 24 and of the filter carrier 7 to integrate them in a practical way in the tubular wall 13 of the housing 1, the reservoir 2 and the compartment 24 have respectively internal walls 26, 27 which embrace the internal wall 28 of the filter carrier 7. Thus, in the upper region of the housing 1, only the protrusion 23 projects from the side wall 13 of the housing.

It will be understood that the coffeemaker thus constituted is easy for the user to employ. Thus, during an operation of filling the cold water reservoir 2, the user pivots the front cover 16 to a raised position shown in broken lines in FIG. 2. This position exposes, in the forward region of the housing the large cross section for filling of said reservoir. Water being poured rapidly and without splashing into said reservoir, the user can directly see the contents of said reservoir during filling. When this operation is completed, the user closes the cover 16. Then the user pivots the filter carrier 7 and easily pours the ground coffee into said filter carrier 7 thanks to the positioning of the water reservoir 2 above the base 10 which thus ensures a better stability of the coffeemaker. The user having replaced the filter carrier 7, need only trigger the operation of the coffeemaker. He can thus see from a distance the proper flow of the coffee into the server and can instantly see the end of the operation thanks to the transparency of the protruding window 19.

We claim:

1. A coffeemaker comprising a housing (1), a cold water reservoir (2) in the housing, a water heater (3) in the housing, a water spout (5) in the housing supplied by the water heater (3), the water spout (5) having an outlet (6) arranged above a filter carrier (7) movably mounted in the housing (1), the filter carrier (7) having a flow opening (8) situated above a server (9) for collecting infusion resting on a base (10); the cold water reservoir (2) overhanging the base (10) and the filter carrier (7) being arranged behind the cold water reservoir (2).

2. A coffeemaker according to claim 1, wherein the cold water reservoir (2) has a front side wall in which is provided a transparent window (19) visible from the outside through an opening (20) provided in the housing (1).

3. A coffeemaker according to claim 2, wherein the housing (1) has a side wall (13) of substantially tubular shape one of whose ends (14) is closed by the base (10) and whose other end (15) comprises at least one removable cover (16, 17), the front region of the side wall (13) having above the base (10) a reception niche (18) for the server (9) and, above this niche (18), the opening (20) through which is visible the transparent window (19) of the cold water reservoir (2).

4. A coffeemaker according to claim 3, wherein the cold water reservoir (2) is contained largely within the housing (1), and the window having a protrusion (23) projecting from the window (20) of the housing (1).

5. A coffeemaker according to claim 4, wherein the base (10) contains the water heater (3), the spout (5) is supplied by means of a rising tube (4) located in a compartment (24) arranged behind the cold water reservoir (2) and laterally of the filter carrier (7).

6. A coffeemaker according to claim 5, wherein the cold water reservoir (2), the compartment (24) and the filter carrier (7) are substantially integrated into the tubular wall (13) of the housing (1), and internal walls (26 and 27) of the reservoir (2) and of the compartment (24) embrace an internal wall (28) of the filter carrier (7).

7. A coffeemaker according to claim 6, wherein the filter carrier (7) is pivotally mounted about a vertical axle (25) arranged adjacent the periphery of the housing (1) in a region opposite said compartment (24).

8. A coffeemaker according to claim 6, wherein the center of gravity G of the coffeemaker is located in the niche (18) adjacent a vertical line passing through the center of the base (10).

* * * * *